United States Patent [19]

Ito et al.

[11] Patent Number: 4,990,768
[45] Date of Patent: Feb. 5, 1991

[54] ELECTRONIC APPARATUS INCLUDING PHOTOELECTRIC SWITCH

[75] Inventors: Mutsuo Ito, Kameoka; Masato Hara, Kyoto; Satoru Shimokawa, Mukou; Ichiro Kondo, Kusatsu, all of Japan

[73] Assignee: Omron Tateisi Electronics Co., Kyoto, Japan

[21] Appl. No.: 433,787

[22] Filed: Nov. 9, 1989

[30] Foreign Application Priority Data

| Nov. 11, 1988 | [JP] | Japan | 63-147910[U] |
| Nov. 11, 1988 | [JP] | Japan | 63-147911[U] |
| Nov. 11, 1988 | [JP] | Japan | 63-147912[U] |
| Nov. 11, 1988 | [JP] | Japan | 63-147913[U] |
| Nov. 11, 1988 | [JP] | Japan | 63-147914[U] |
| Nov. 11, 1988 | [JP] | Japan | 63-147915[U] |
| Nov. 11, 1988 | [JP] | Japan | 63-147916[U] |
| Nov. 11, 1988 | [JP] | Japan | 63-147917[U] |

[51] Int. Cl.⁵ .............................................. H01J 5/02
[52] U.S. Cl. ..................................... 250/239; 361/397
[58] Field of Search ................... 250/239; 174/50.54; 361/395, 397, 399

[56] References Cited

U.S. PATENT DOCUMENTS 3,842,258 10/1974 Shaw ................................. 250/239
4,127,328 11/1978 Gorgone et al. ................... 250/239

Primary Examiner—David C. Nelms
Attorney, Agent, or Firm—Dickstein, Shapiro & Morin

[57] ABSTRACT

An electronic apparatus includes a case body having an opening in an upper side thereof, an annular groove provided on the outer periphery of the opening and an engaging hole in a portion of the case above the annular groove, an annular sealing ring inserted into the annular groove, a frame for supporting printed circuit boards on which electronic circuitry is mounted, the frame being formed to include a terminal base provided on the side of the opening of the case body, and having a resilient projection for mating with the engaging hole of the case body from an inner side thereof, and a main body cover provided with an inwardly directed projection for mating with the engaging hole of the case body from an outer side thereof, the main body cover covering the opening by mating the projection with the engaging hole of the case body.

8 Claims, 15 Drawing Sheets

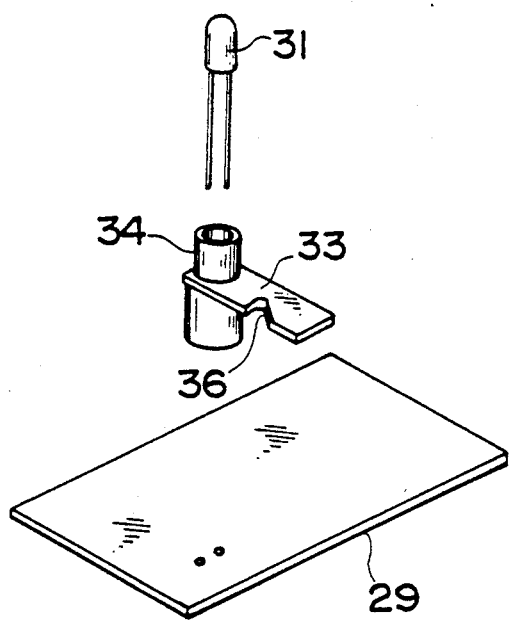
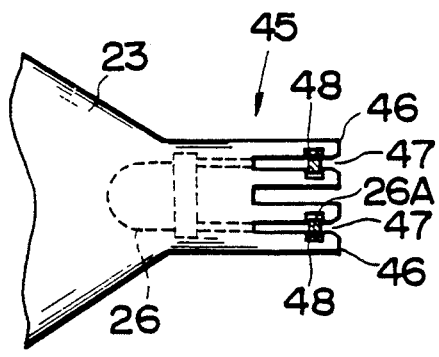
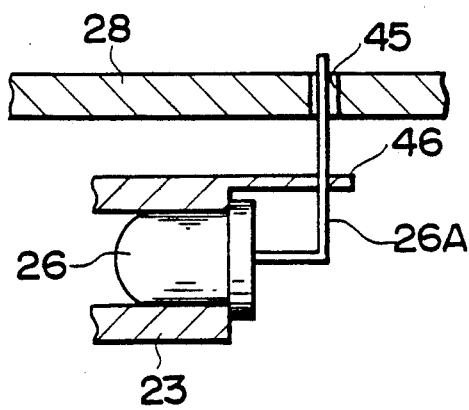

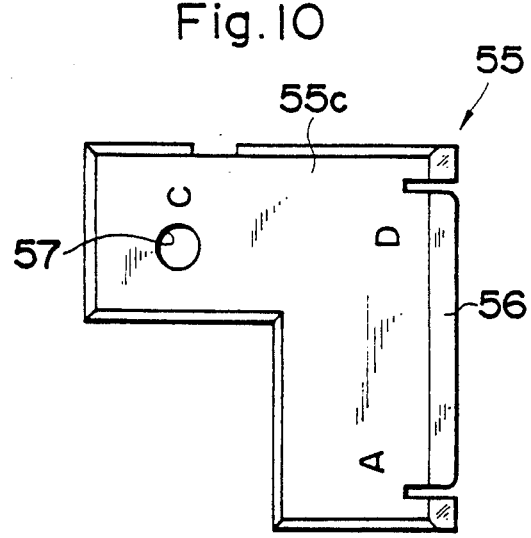
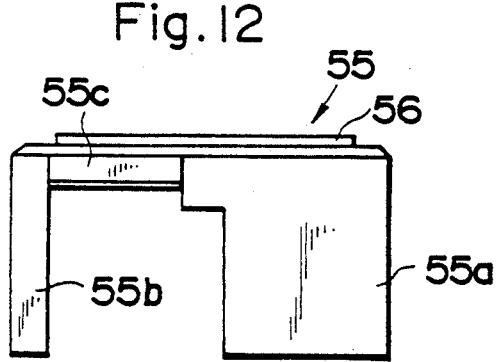
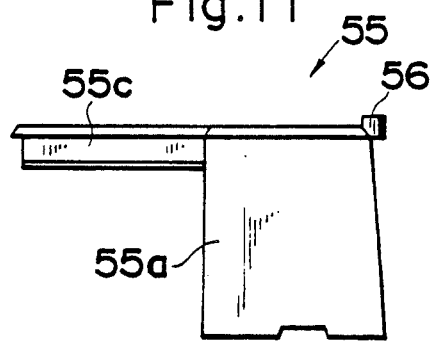

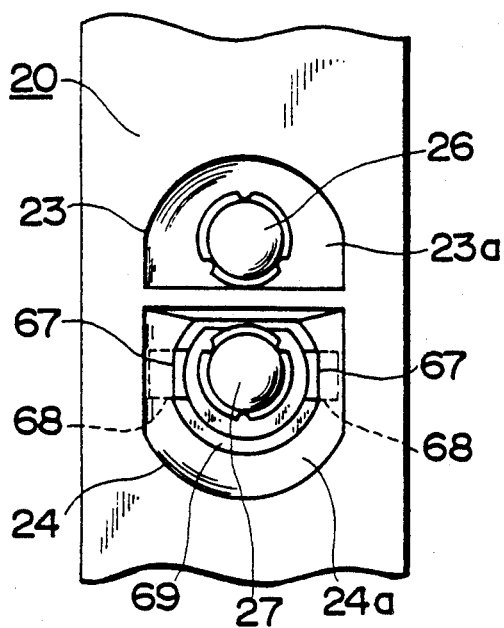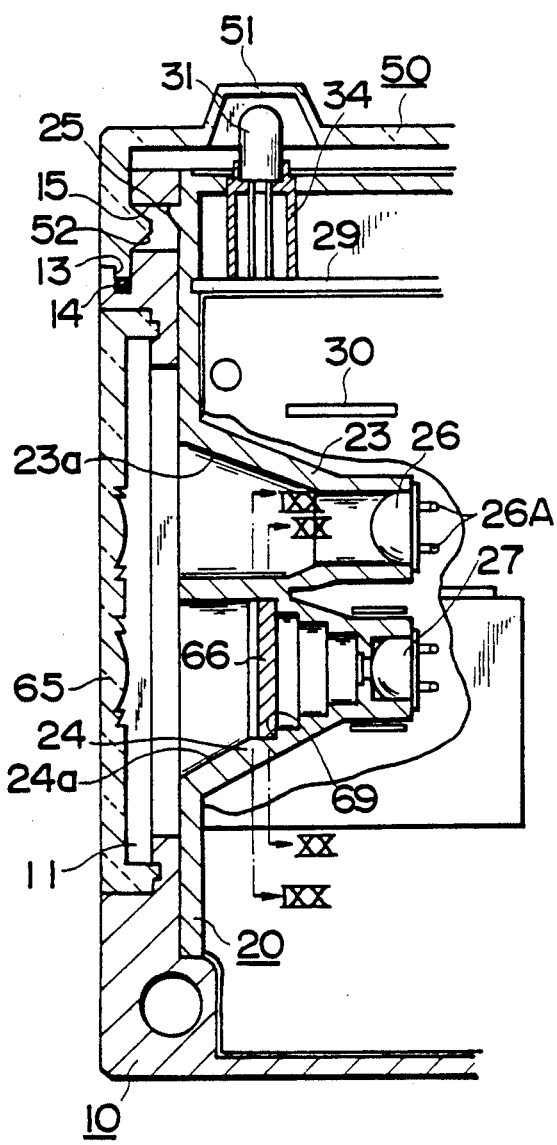

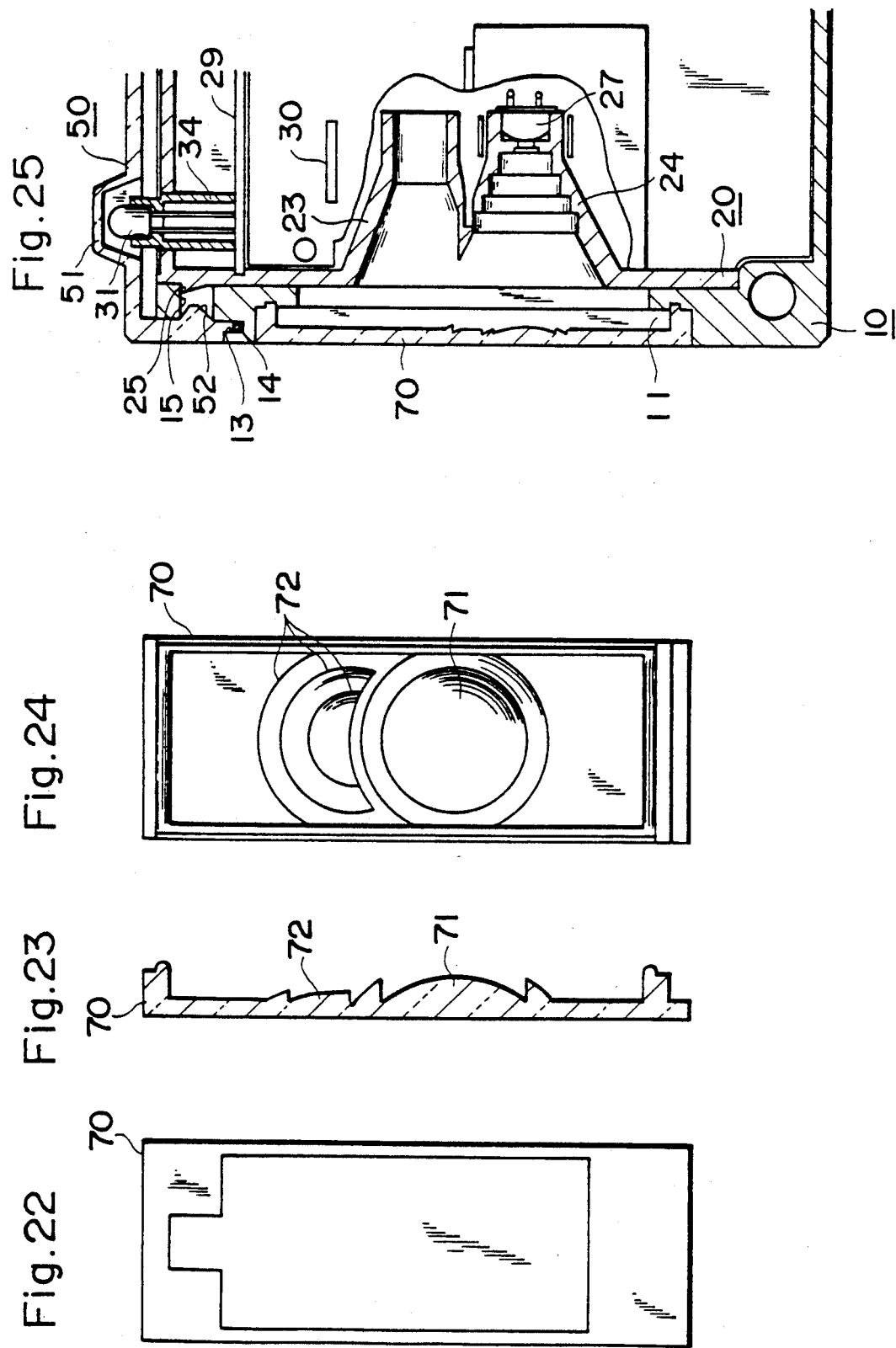

Fig.26
Fig.27
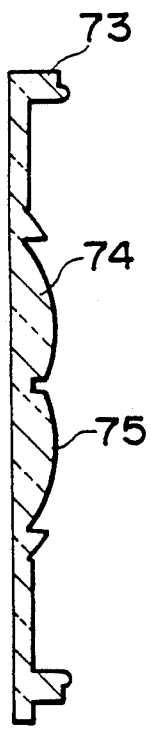
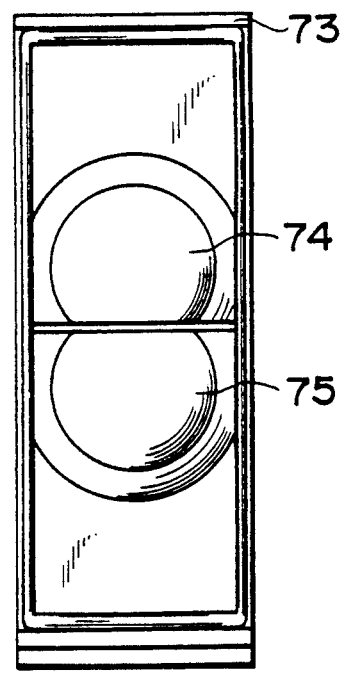

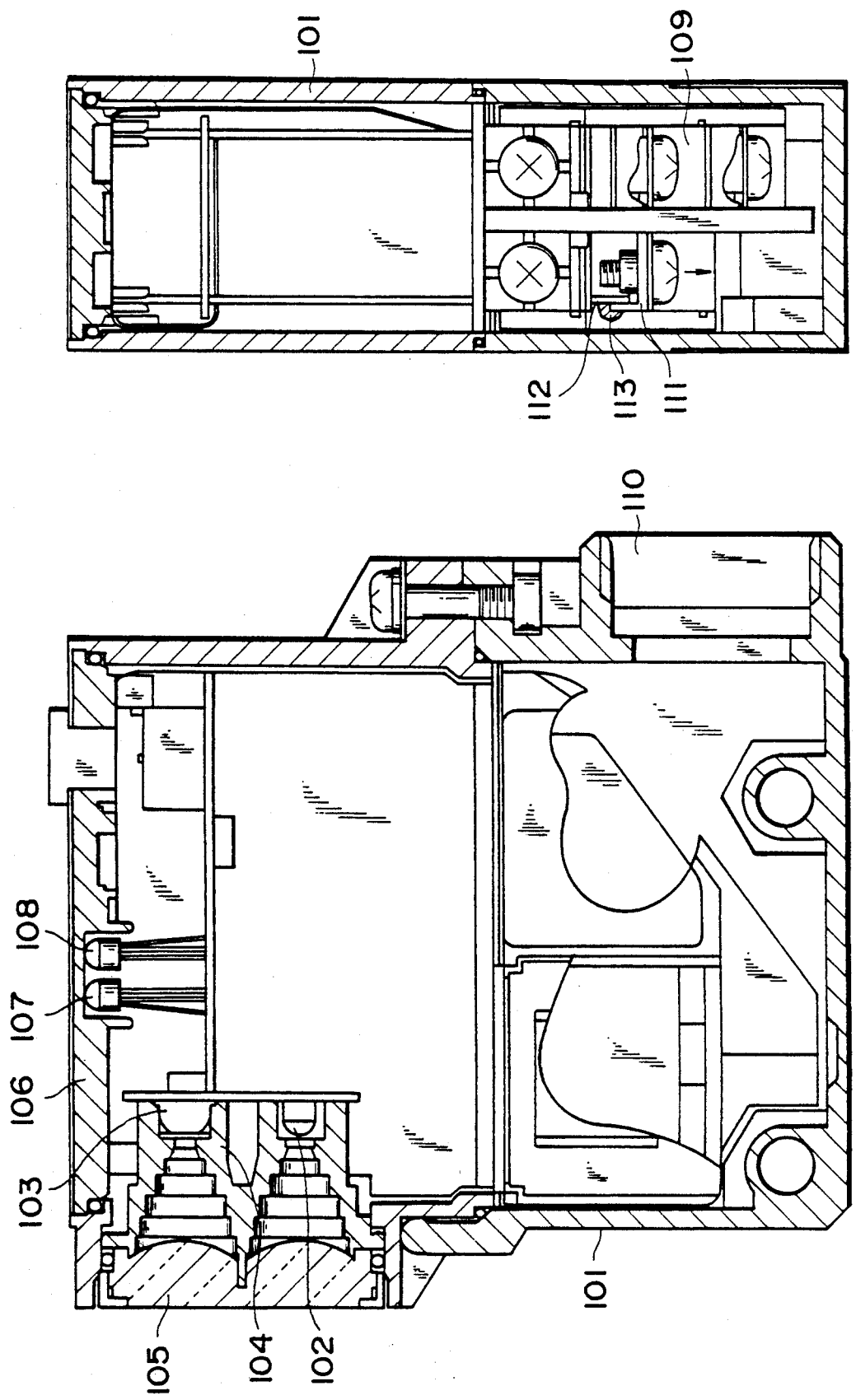

ELECTRONIC APPARATUS INCLUDING PHOTOELECTRIC SWITCH

BACKGROUND OF THE INVENTION

1. Field of the Invention

This invention relates to an electronic apparatus which includes a photoelectric switch.

2. Description of the Related Art

As shown for example in FIGS. 28 and 29, which are longitudinal sectional views as seen from different directions, a photoelectric switch includes a case 101 having an opening, an element holder 104 mounted at the opening and having an infrared light-emitting diode 102 and a phototransistor 103, and lenses 105 provided on respective optic axes. The case opening is closed by the lenses 105. A plate 106 is provided on the upper portion of the case 101, and light-emitting diodes 107, 108 for display purposes are provided on a predetermined portion of the plate. Also provided on the plate are dials or the like for sensitivity adjustment. The photoelectric switch also includes a terminal base portion 109, which is for switching on and off an externally applied signal, provided below a printed circuit board 112. A cable is inserted from an opening 110 provided in the back side of the case and is fixedly connected to a terminal on the terminal base portion 109.

With a photoelectric switch of this kind, the terminal base portion 109 provided with the terminal to which the cable is connected is situated at the lower part of the photoelectric switch. Consequently, after the printed circuit board 112 has been mounted on the upper portion, it is difficult to attach and detach the terminus of the cable and labor is required for wiring and maintenance operations. Further, a sealing structure between the lenses and a frame is achieved by providing an O-ring between a cover and the case, which has an L-shaped cross section, by way of example. However, a sufficiently air-tight and water-proof structure cannot be obtained owing to gaps between the lenses and frame and movement of the cover. Though use is also made of a photoelectric switch in which the frame is provided inside the case, the element holder and the frame are not designed as a unitary body. Consequently, more labor is needed for mounting and the molds needed are more complicated. The end result is higher manufacturing cost.

Furthermore, with a photoelectric switch of this type, the connecting portion between the terminal base and the printed circuit board is not so designed that the pin of a terminal attaching piece 111 is introduced into the printed circuit board 112. Accordingly, the terminal attaching piece 111 and the printed circuit board 112 are connected at a position indicated by a soldered portion 113. As a consequence, inserting the terminal attaching piece into the printed circuit board and soldering them together is difficult and results in poor assembly operability. In addition, there is little tensile strength in the direction of the arrow and automatic assembly is not possible.

In photoelectric switches and the like, a frame is provided within a case in order to fix a variety of parts. A printed circuit board is attached to the frame. In a case where a display lamp such as a light-emitting diode is attached to the printed circuit board, as shown in the top view of FIG. 30 and sectional view of FIG. 31, an opening 122 is formed in a frame 121, holes are provided in a printed circuit board 123 at a position corresponding to the opening 122, a display element 124 is inserted from above into the opening 122 of the frame 121 and into terminal holes of the printed circuit board 123, and the display element is attached by being soldered from below.

In an electronic apparatus of this kind, the fact that the display element 124 is inserted from the opening 122 at the upper side of the frame 121 makes it difficult to insert the terminals of the display lamp into the holes of the printed circuit board 123. In addition, assembly operability is poor since the soldering operation is performed by hand. Furthermore, a great deal of labor is involved and automatic assembly is not feasible.

In another photoelectric switch, as shown for example in the sectional view of FIG. 32, a holding portion 132 of a photoelectric element 131 to which are attached a light-emitting element and a light-receiving element is provided inside a case 130. There are cases in which a filter 133 such as a color filter or polarizing filter is attached to a horn-shaped part of the photoelectric element holding portion 132. When the filter is attached in the photoelectric switch of this type, the filter 133 is inserted into a portion cut away into a rectangular shape to conform to the shape of the filter 133, as shown in FIG. 33 which is a front view of the photoelectric element holding portion 132, and the horn-shaped portion surrounding the filter is deformed as by a soldering iron to secure the filter 133. Further, as shown in FIG. 34, the photoelectric element holding portion is provided with bosses 134, 135, the filter 133 is inserted into the rectangularly shaped cut-out portion of the horn-shaped holding member 132 with openings in the filter 133 being registered with the bosses 134, 135, and the bosses 134, 135 are deformed by heat to fix the filter 133.

However, in a photoelectric switch having such a filter, it is necessary to attach the filter at a position deep within the horn-shaped part of the photoelectric element holding portion. As a result, not only is an operation such as heat-caulking difficult to perform and greater labor required, but the filter may be damaged and cannot be secured normally. This tends to result in defective articles.

Photoelectric switches are classified into three types, names a transmission type, diffuse reflection type and regressive reflection type. In the reflection-type photoelectric switches, it is necessary to provide a light-emitting element and a light-receiving element at the front side of the case. Since the transmission-type photoelectric switch has a configuration in which the light-emitting element and light-receiving element are separated, only one of these is disposed on the front side of the switch. In order to converge the light beams from these photoelectric elements on a predetermined area or condense the reflected light beams, a lens is provided on the front side of the case. Each switch has its own special case depending upon switch type, and the arrangement is such that the lens is attached to the front side of the case and the light-emitting and/or light-receiving elements are secured within the case.

In accordance with a photoelectric switch of this kind, a different case is required for each kind of photoelectric switch. As a result, there are a large variety of parts and a great number of molds involved. This not only raises price but also complicates maintenance. If the transmission type photoelectric switch is adapted to use the same case as the reflection-type photoelectric switches in order that common cases can be employed, the lens will be offset far from the center of the photoelectric switch. This is undesirable in that it detracts from the appearance of the switch and therefore diminishes its commercial value.

In the photoelectric switch shown in FIGS. 28 and 29, no cover is provided for covering the terminals on the terminal base within the case. Accordingly, in cases where a commercial AC power supply is directly connected at the time of connection or adjustment, there is the danger of electric shock.

In order to protect the elements and circuitry mounted on the printed circuit board against electromagnetic noise, a shielding plate is attached to the printed circuit board of the electronic apparatus. In such case, projections 142 are provided on the bottom side of a box-shaped shielding plate 141, as shown in FIGS. 35 and 36, a printed circuit board 143 is provided with openings 143a at positions corresponding to these projections, the projections 142 are inserted into the corresponding openings 143a and the tips thereof are bent to secure the shielding plate 141, after which the projections 142 are connected by solder or the like to a grounded wiring pattern on the printed circuit board 143. The shielding plate 141 is thus attached to the printed circuit board 143.

In an electronic apparatus of this kind, it is necessary to insert the projections into the openings in the printed cirCuit board and bend the projections when attaching the shielding plate. This is a drawback in that labor is required at the time of assembly.

Furthermore, when an individual part 152 such as a light-emitting diode is attached to a printed circuit board 144, as shown in FIG. 37, the individual part 152 is retained in a holding portion 153 and an electrode pin 152a of the part is bent beforehand. The pin 152a is registered with and inserted into an opening 145 provided in the printed circuit board 144 and the pin is electrically connected and secured by soldering to a wiring pattern on the printed circuit board 144.

When the individual part is attached in this conventional arrangement, however, it is difficult to make the bend angle of the electrode pin 152a uniform, so that disparities in the bend angle usually occur. As a result, the electrode pin cannot be readily inserted into the opening 145 of the printed circuit board 144. In particular, when the assembly of the electronic apparatus is performed automatically, the electrode pin cannot be inserted into the opening of the printed circuit board unless the pin is bent appropriately. As a consequence, automation is difficult to achieve and assembly operability is poor when assembly is performed by hand.

SUMMARY OF THE INVENTION

An object of the present invention is to provide an electronic apparatus having a comparatively simple frame structure which facilitates assembly operability and enhances sealing effect.

Another object of the present invention is to solve the problem regarding the connecting portion between terminal base and printed circuit board thereby to facilitate connection as well as automatic assembly.

Another object of the present invention is to solve the problem encountered at assembly of the display lamp by making it possible to mount the display lamp on the printed circuit board in advance and readily attach it to the overlying frame.

Still another object of the present invention is to solve the problem encountered at the filter mounting portion of the photoelectric switch by making it possible to readily mount the filter without deforming the horn portion or bosses by heat.

A further object of the present invention is to make common use of a photoelectric switch case without adopting a different case for each type of switch, and to improve design balance with regard to the position of the lens.

A further object of the present invention is to prevent electric shock by providing terminals with a protective cover.

A further object of the present invention is to improve upon the problem encountered in the electronic apparatus having a shielding plate by making it possible to readily attach the shielding plate to the printed circuit board without a bending step.

A further object of the present invention is to make it possible to accurately insert the electrode pin of an individual part into the opening in the printed circuit board.

An electronic apparatus in accordance with the present invention is characterized by comprising a case body having an opening in an upper side thereof, an annular groove provided on the outer periphery of the opening and an engaging hole in a portion of the case above the annular groove, an annular sealing ring inserted into the annular groove, a frame for supporting printed circuit boards on which electronic circuitry is mounted, the frame being formed to include a terminal base provided on the side of the opening of the case body, and having a resilient projection for engaging the engaging hole of the case body from an inner side thereof, and a main body cover provided with an inwardly directed projection for engaging the engaging hole of the case body from an outer side thereof, the main body cover covering the opening by mating the projection with the engaging hole of the case body.

In accordance with the electronic apparatus of the invention having these characterizing features, the sealing ring is inserted into the annular groove provided in the opening of the case body, and the main body cover is attached from above the opening to maintain the electronic apparatus in an air-tight state. Further, the resilient projection of the frame is mated with the hole in the portion of the case above the opening from the inner side of the case, thereby retaining the frame within the case body. The projection on the main body cover is mated with this hole from the outer side of the case.

Thus, in accordance with this aspect of the present invention, the terminal portion of the frame is opened merely by opening the main body cover. This facilitates cable connection, maintenance and inspection. Since the annular groove is formed in the opening of the case and is provided with the sealing ring to effect a hermetically sealed structure, the resistance of the apparatus to the environment is greatly improved. Since the engagement between the frame and the main body cover is achieved by virtue of the engaging hole provided in the case body, the inner wall of the case can be made a flat surface, which is suited to joining with a high-frequency welder or the like. Moreover, by using the frame with which the element holder and terminal base are integrally formed, the number of mold parts can be reduced and price can be lowered significantly.

An electronic apparatus in accordance with another aspect of the present invention is characterized by comprising a case body having an upper side which is open, and a frame for holding a printed circuit board on which electronic circuitry is mounted, the frame being retained inside the case body and having a terminal base, wherein the terminal base of the frame is provided with the printed circuit board on one side face thereof and has an insert fixing groove for guiding a terminal attaching member into the frame from the side and for preventing the terminal mounting member from being pulled out from above, and a terminal guide for guiding a pin of the terminal attaching member inserted from another side surface to the printed circuit board.

In accordance with the electronic apparatus having these characterizing features, the terminal base of the frame is formed to include an inserting and fixing groove at a position corresponding to the terminal attaching member to be installed. Accordingly, by inserting the terminal attaching member into the insertion and fixing groove, the terminal attaching member can be attached with ease. Further, since the end portion of the terminal attaching member engages with the groove, it is prevented from being pulled out from above. Furthermore, the pin of the terminal attaching member is guided to the printed circuit board by the terminal guide to effect connection.

Thus, in accordance with this aspect of the present invention, insertion of the terminal attaching member is facilitated. This no only improves assembly operability but also increases strength with regard to upward pullout of the terminal. Since the pin of the terminal attaching member is guided by the terminal guide to the printed circuit board provided on one side face, the pin can readily be inserted into a soldering opening, and the end portion of the pin of the terminal attaching member can be connected to a wiring pattern on the printed circuit board. Accordingly, it is possible to automate the insertion and soldering of the terminal attaching member.

In another aspect of the invention, there is provided an electronic apparatus having a case, a frame on which parts are mounted disposed inside the case, and a display element mounted on a printed circuit board within the frame, characterized by having a notch formed in the frame at a position at which the display element is to be mounted, the notch being cut in from one side of the frame, and a cylindrical member provided on the printed circuit board and formed to have a plate-shaped piece on one side thereof for mating with the notch of the frame, the display element being provided on the cylindrical member.

In accordance with the present invention having these characterizing features, a display element such as a light-emitting diode is mounted beforehand, via the cylindrical member, on the printed circuit board at a predetermined position thereof by means of soldering. In this state, the plate-shaped piece provided on the cylindrical member mates with the notch of the frame to fix the printed circuit board and the frame together.

Thus, in accordance with this aspect of the invention, the display element and the cylindrical member are mounted on the printed circuit board before they are attached to the frame. As a result, it is unnecessary to insert the display element from the opening of the frame to the terminal hole provided in the printed circuit board, thereby making it possible to improve assembly operability. By adopting this structure, it is possible to automatically solder the display element to the printed circuit board in a similar manner as other parts, thus making it possible to automate manufacture. In addition, since is it arranged so that the plate-shaped piece of the cylindrical member mates with the notch of the frame, attaching strength can be increased.

In another aspect of the invention, there is provided a photoelectric switch having a case, and a photoelectric element holder portion mounted within the case and facing a front side of the case for holding a photoelectric element, characterized in that the photoelectric element holder portion is provided with a step having a shape substantially the same as that of a filter for holding the filter orthogonal to an optic axis, and a plurality of engaging portions, located at an outer periphery of the step, for engaging edge portions of the filter, wherein the filter is held within the step by engaging the edge portions thereof by the engaging portions of the photoelectric element holder portion.

In accordance with the present invention having these characterizing features, the photoelectric element holder portion for holding the photoelectric element is provided with the step having an external shape corresponding to that of a filter for holding the filter on its optic axis, and engaging portions at the periphery of the step for covering portions of the filter. Accordingly, the filter is inserted into the step of the photoelectric element holding portion by inserting it from the front side of the opening and slightly flexing it. As a result, both edges of the filter are engaged by the engaging portions so that the filter is retained.

Thus, in accordance with this aspect of the present invention, it is unnecessary to fix the filter by deforming the horn portion of the filter holder using heat caulking or by providing the filter with holes, registering bosses with these holes, inserting the filter into the filter holder and deforming the bosses. The filter is held in place merely by being inserted. This makes it possible to greatly improve assembly operability, eliminates the risk of damaging the filter at the time of heating and raises yield.

The present invention provides a transmission-type photoelectric switch having a light-emitting element or a light-receiving element, characterized in that a lens plate is provided in a rectangular opening of a case, forms a central portion of a lens at a position offset from the center of the plate, and forms arcuate grooves, having a shape approximately the same as that of the lens, at one side of the lens.

In accordance with the invention having these characterizing features, a lens portion is formed at a position offset from the center of the rectangular lens plate provided on the front side of the case, and the arcuate grooves of concentric circles having approximately the same shape as that of the lens are formed on one side of the lens. The photoelectric element of the transmission-type photoelectric switch is disposed at the focal point of the lens on the lens plate to converge projected light in a predetermined direction or to condense and receive light obtained from a predetermined direction.

Thus, in accordance with this aspect of the present invention, a case and frame common to that of a reflection-type photoelectric switch are used so that a light-emitting device or light-receiving device of a transmission-type photoelectric switch can be constructed. With a reflection-type photoelectric switch, a lens plate on which two lenses are formed close together are used and attached to the front side of the case. In a transmission-type photoelectric switch, the photoelectric switch is constructed using the lens plate according to the present invention, namely the lens plate having one lens portion and the grooves concentric therewith. In this case also the lens plate is provided on the front side of the case which has the photoelectric element provided at the focal point of the lens possessing a lens effect. As a result, light can be condensed or converged at a predetermined area. Though the arcuate grooves are provided in close proximity to the lens, these do not have a lens effect but are provided to achieve design balance for the sake of external appearance. Therefore the photoelectric switch has the same external shape as a reflection-type photoelectric switch and enhances balance in terms of design.

The present invention provides an electronic apparatus characterized by comprising a case body an upper side of which is open, a terminal base provided inside the case body and formed to include a plurality of terminal holding portions for power supply and output as recesses, the terminal base holding terminals on a bottom side thereof, a terminal base cover having protrusions which fit into the recesses of the terminal base for covering the plurality of terminal holding portions, an upper side of the terminal base cover having a resilient projection and an aperture at a position corresponding to the center of a predetermined terminal, and a main body cover for covering the opening of the case body and abutting against the resilient projection of the terminal base cover.

In accordance with the present invention having these characterizing features, the protrusions of the terminal base cover are fixedly fitted into the recesses of the terminal base inside the case. By attaching the main body cover to the opening of the case body, the inner wall thereof abuts against the resilient projection of the terminal base cover, thereby fixing the terminal base cover. At the time of adjustment, the terminal base cover appears as a result of opening the main body cover, and the voltage at a predetermined terminal can be measured via the opening in the terminal base cover.

Thus, in accordance with this aspect of the present invention, the adjustment operation can be performed while the terminal base cover is left attached, thereby greatly reducing the possibility of electric shock at the time of adjustment. In addition, the terminal base cover can be readily secured merely be inserting it into the terminal base.

The present invention provides an electronic apparatus equipped with a shielding plate, characterized by comprising a shielding plate a lower end of which has a plurality of projections, the projections having anchoring portions protruding at least to one side, and a printed circuit board provided with holes at positions corresponding to the projections of the shielding plate, the projections being inserted into the holes to connect the shielding plate to the printed circuit board.

In accordance with the present invention having these characterizing features, the shielding plate is provisionally secured by the anchoring portions merely by inserting the projections of the shielding plate into the openings in the printed circuit board. The shielding plate is fixed by connecting the distal ends of the projections to a predetermined conductor pattern on the printed circuit board by means of soldering.

Thus, in accordance with this aspect of the present invention, it is no longer necessary to bend the projections of the shielding plate, as a result of which assembly operability can be improved. Accordingly, when the electronic apparatus is automatically assembled as by a robot, a step for bending the projections can be dispensed with so that that soldering can be performed immediately. This facilitates automation.

The present invention provides an electronic apparatus in which an individual part is attached to a printed circuit board, characterized by comprising a holder portion for holding an individual part, and a positioning hook provided at one end of the holder portion for holding a respective electrode pin of the individual part, the held electrode pin being fixedly inserted into an opening of the printed circuit board.

In accordance with the present invention having these characterizing features, the individual part is held by the holding portion, and the electrode pin of the individual part is positioned by the positioning hook provided at one end of the holding portion so as to be held at an accurate position. Accordingly, the position of the electrode pin will undergo almost no change also when the individual part is mounted on the printed circuit board, so that the electrode pin can be inserted into the hole of the printed circuit board at such time.

Thus, in accordance with the present invention, the electrode pin of the individual part can be accurately positioned. This makes it possible to readily insert the pin into the hole of the printed circuit board and improve assembly operability. Accordingly, the invention also facilitates automatic assembly of the electronic apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is an exploded, perspective view showing the mounting portion of a display element;

FIG. 8 is a front view showing a positioning hook of an element holder;

FIG. 9 is a sectional view showing the manner in which a terminal pin is secured in a printed circuit board;

FIGS. 10 through 12 illustrate a terminal base, in which FIG. 10 is a plan view, FIG. 11 a side view and FIG. 12 a front view;

FIG. 17 is a sectional view corresponding to FIG. 3 and showing another embodiment of the photoelectric switch;

FIG. 18 is a front view of a portion of a frame;

FIG. 22 is a front view of a lens plate;

FIG. 23 is a central, longitudinal sectional view of the lens plate;

FIG. 24 is a back view of the lens plate;

FIG. 25 is a sectional view corresponding to FIG. 3 and showing a photoelectric switch to which the lens plate is attached;

FIG. 26 is a sectional view showing the lens plate used in a reflection-type photoelectric switch;

FIG. 27 is a front view of the same; and

FIGS. 28 through 37 are views illustrating the related art, in which:

FIGS. 28 and 29 are sectional views showing a photoelectric switch sectioned from respectively different directions;

FIGS. 30 and 31 show the manner in which a display element is attached, wherein FIG. 30 is a plan view and FIG. 31 a sectional view;

FIG. 32 is a sectional view showing a photoelectric switch equipped with a filter;

FIGS. 33 and 34 are front views showing the manner in which the filter is attached;

FIG. 35 is a perspective view of a shielding plate;

FIG. 36 is a sectional view showing the manner in which the shielding plate is attached to a printed circuit board; and FIG. 37 is a sectional view showing the manner in which an individual part is attached to a printed circuit board.

DESCRIPTION OF THE PREFERRED EMBODIMENTS

Figure 1:
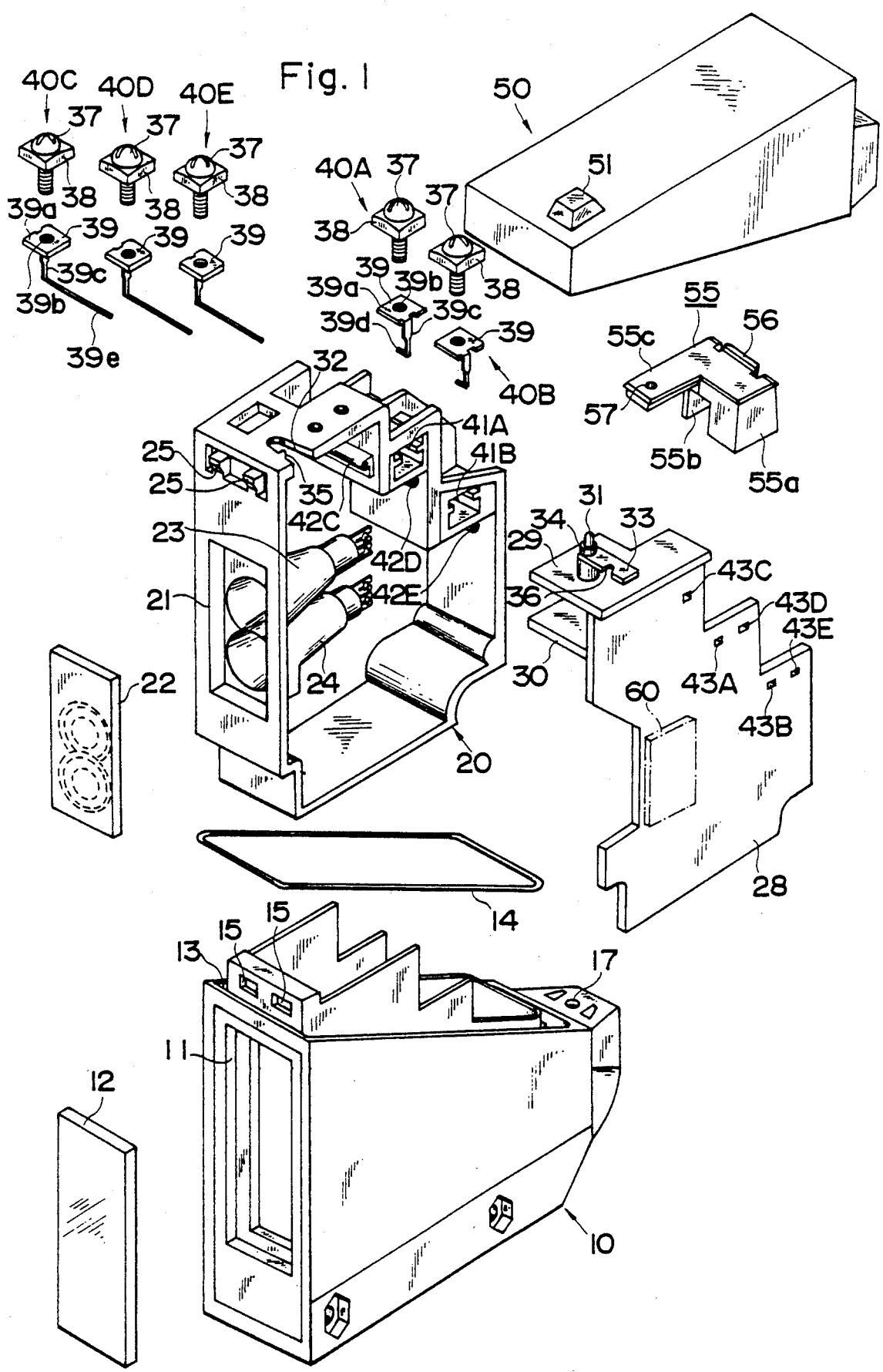
FIG. 1 is an exploded, perspective view of a photoelectric switch illustrating an embodiment of the present invention.
Figure 2:
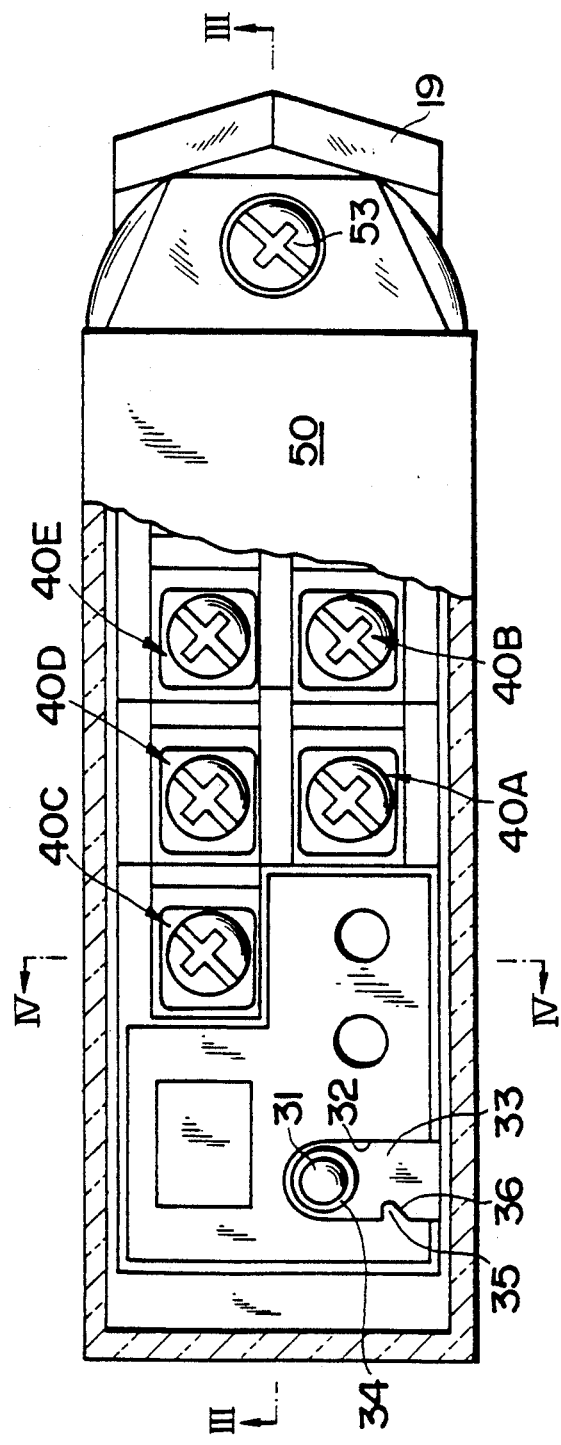
FIG. 2 is a plan view, partially cut away, showing the photoelectric switch.
Figure 3:
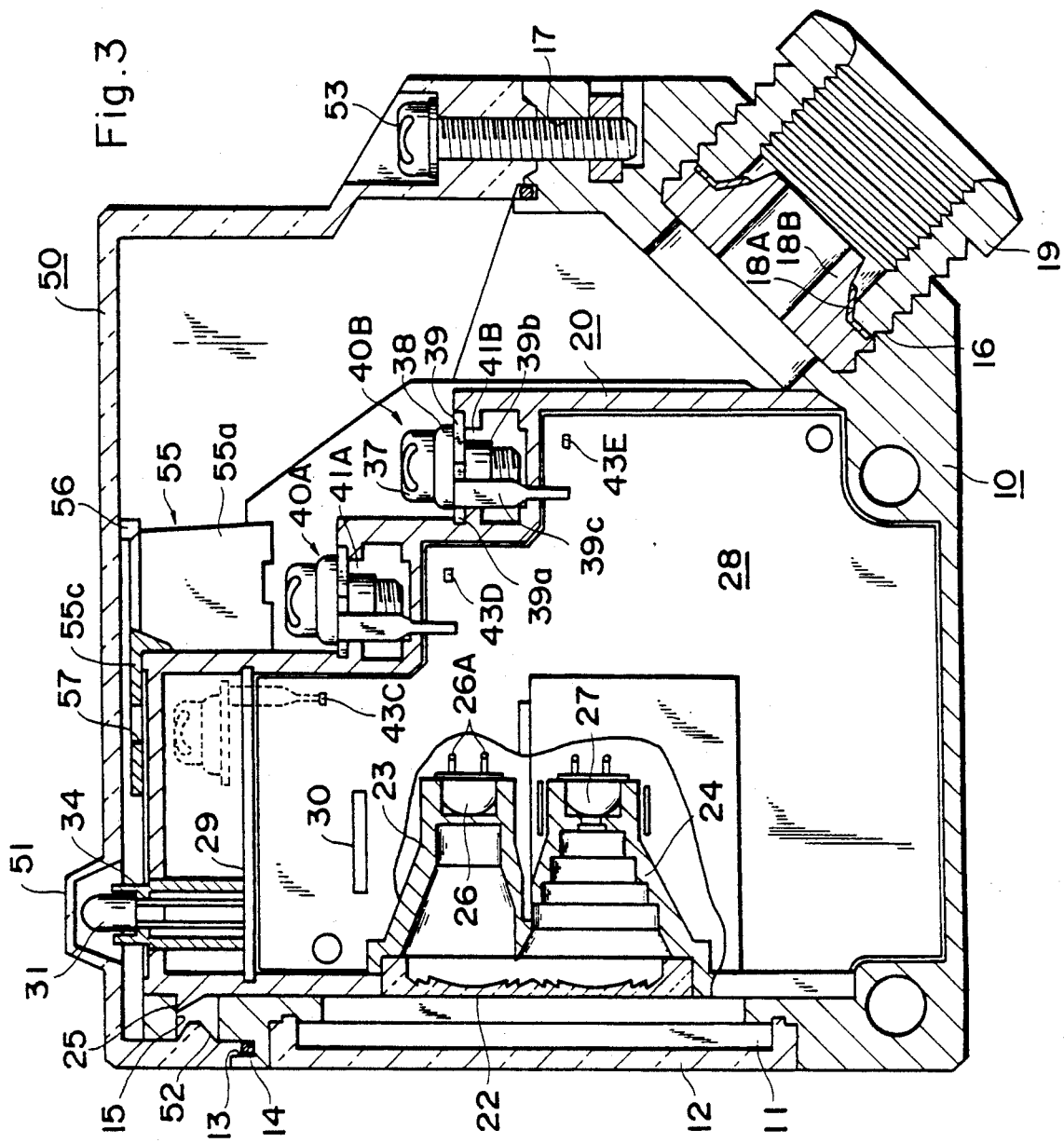
FIG. 3 is a sectional view taken along line III—III of FIG. 2.
Figure 4:
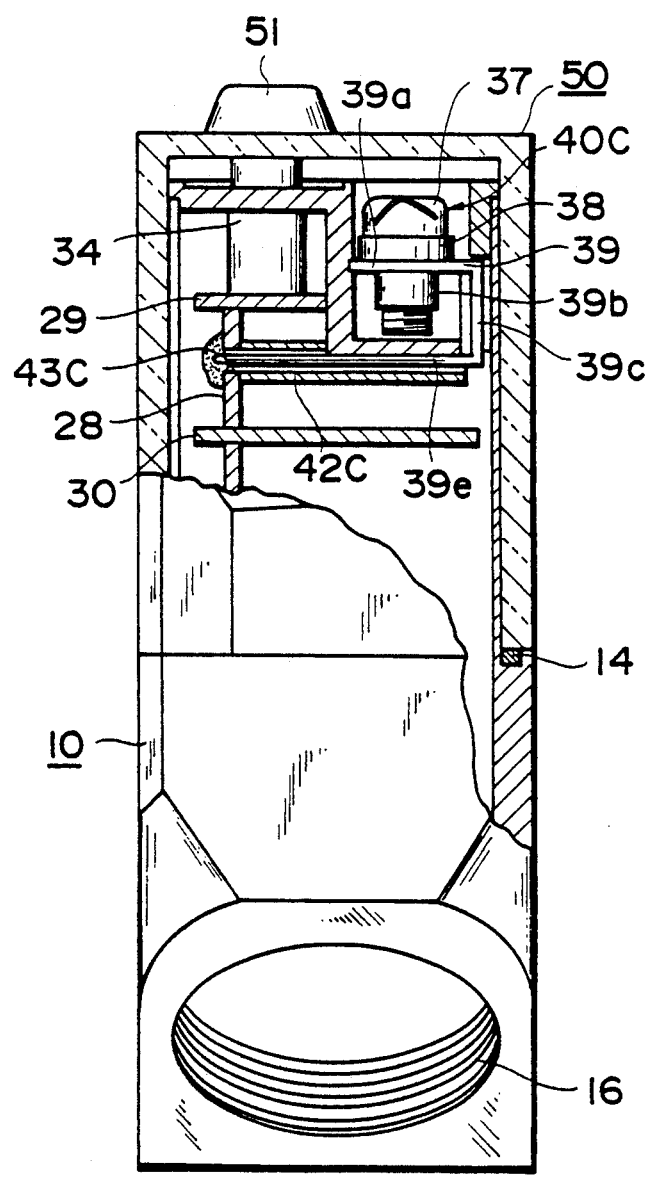
FIG. 4 is a back view showing the photoelectric switch with a portion thereof cut away along line IV—IV of FIG. 2.

An embodiment of the present invention is illustrated primarily in FIGS. 1 through 4. FIG. 1 is an exploded perspective view of a photoelectric switch, FIG. 2 is a plan view, partially cut away, showing the photoelectric switch, FIG. 3 is a sectional view taken along line III—III of FIG. 2, and FIG. 4 is a back view showing the photoelectric switch with a portion thereof cut away along line IV—IV of FIG. 2.

As shown in these Figures, the photoelectric switch comprises a case body 10, a frame 20 accommodated within the case body 10, and a cover 50. The case body 10 is a box-shaped member the upper portion of which is open. Formed in the front side of the case body is a rectangular opening 11 for being provided with a lens cover 12. Threads 16 for inserting a cable are formed in an inclined direction in the back side of the case body in the lower part thereof. The side wall of the upper portion of the case is formed into a step-shaped configuration. An annular groove 13 is formed in the upper end face of the case side wall along the periphery of the opening and is inclined at a predetermined angle with respect to the bottom face. A pair of openings 15 are formed in the front side of the case body 10 in a wall portion thereof projecting upwardly from the groove 13. An annular sealing ring 14 is inserted into the groove 13 of the case body 10.

The frame 20 is inserted into case body 10. The frame 20 is a frame-shaped member in which an element holder and a terminal base are formed into a unitary body. An opening 21 is formed in the front side of the frame 20. Formed on the inner side of the frame 20 are element holder portions 23, 24 for attaching a light-emitting element 26, such as an infrared light-emitting diode, and a light-receiving element 27, such as a phototransistor. A pair of resilient projections 25 are provided on the portion of the frame above the opening 21. A step-shaped terminal base for attaching terminals 40A–40E is formed on the upper portion of the frame 20.

A Fresnel lens 22 is attached to the opening 21 in the front side of the frame 20, and a printed circuit board 28 having an outer profile corresponding to the shape of the frame 20 is attached to the frame from the side thereof. As will be described below, the terminals 40A–40E of the terminal base are connected to a wiring conductor pattern on the printed circuit board 28. Terminals of the light-emitting element 26 and light-receiving element 27 provided on the element holder portions 23, 24 are also connected to the printed circuit board. Mounted on the printed circuit board 28 are a drive circuit for driving the light-emitting element 26 and a detecting circuit for outputting a detection signal indicative of an object in response to interruption of a signal obtained from the light-receiving element. This output signal from the detecting circuit is applied to a predetermined terminal on the terminal base via a relay circuit. Printed circuit boards 29, 30 parallel to the top side of the frame 20 are attached to the printed circuit board 28, and a display element 31 which provides an operation display, such as a light emitting diode, is attached to the upper portion of the printed circuit board 29.

A main body cover 50 is attached to the case body 10 so as to close the opening in the upper portion thereof. The main body cover 50 is a substantially transparent member, the lower side of which is open, and is attached so as to snugly fasten the sealing ring 14 fitted into the groove 13 provided in the case body 10. The inner front side of the cover 50 is provided with projections 52 which mate with the openings 15 in the upper portion of the case body 10 from the outer side thereof. The cover 50 is secured to the case body 10 by mating the projections 52 with the openings 15 on the front side and screwing a screw 53 into a screw hole 17 of the case body 10.

A hexagonal nut 19 is attached to the threads 16 at the lower part of the case body 10 via an annular sealing rubber 18A and a washer 18B. The lens cover 12 is attached to the opening 11 in the front side of the case body 10.

A U-shaped notch 32 is formed in the top face of the frame 20 from one side thereof and is formed to have a finger 35 on its periphery. As shown in the exploded perspective view of FIG. 5, a cylindrical member 34 is fixedly secured to the printed circuit board 29. Formed somewhat near the upper end of the cylindrical member 34 integrally therewith is a plate-shaped piece 33 shaped exactly to fit into the notch 32. The plate-shaped piece 33 is formed to have a cut-out 36 into which the finger 35 fits. The display element 31 is secured to the upper portion of the cylindrical member 34 and has terminal pins connected to a wiring pattern on the printed circuit board 29 through the cylindrical member 34. Accordingly, when the board 29 is inserted into the frame 20 from the side thereof, the plate-shaped piece 33 fits into the notch 32 and the finger 35 mates with the cut-out 36. The plate-shaped piece 33 forms a portion of the upper face of frame 20.

The terminals 40A, 40B and 40C, 40D, 40E are provided in two rows on the step-shaped terminal base formed on frame 20. Each of these terminals 40A–40E is composed of a terminal screw 37, a washer 38 and a terminal attaching member 39. The terminal attaching member of each of the terminals 40A, 40B on one side is composed of a flat plate portion 39a, a female screw 39b formed as a part of the flat plate portion 39a and extending downwardly from the center thereof, and a pin 39c extending downwardly from one side of the flat plate portion 39a. The lower end portion of the pin 39c is bent at a right angle (indicated at numeral 39d). The terminal attaching member of each of the terminals 40C–40E on the other side includes the flat plate portion 39a, the female screw 39b and the pin 39c, and the lower end portion of the pin 39c is bent and considerably elongated (indicated at numeral 39e). The screw 37 is screwed into the female screw 39b of each of these terminal attaching members 39. The printed circuit board 28 is provided with holes 43A–43E into which the lower end portions 39d, 39e of the pins 39c of terminal attaching portions 39 are inserted.

Figure 6:
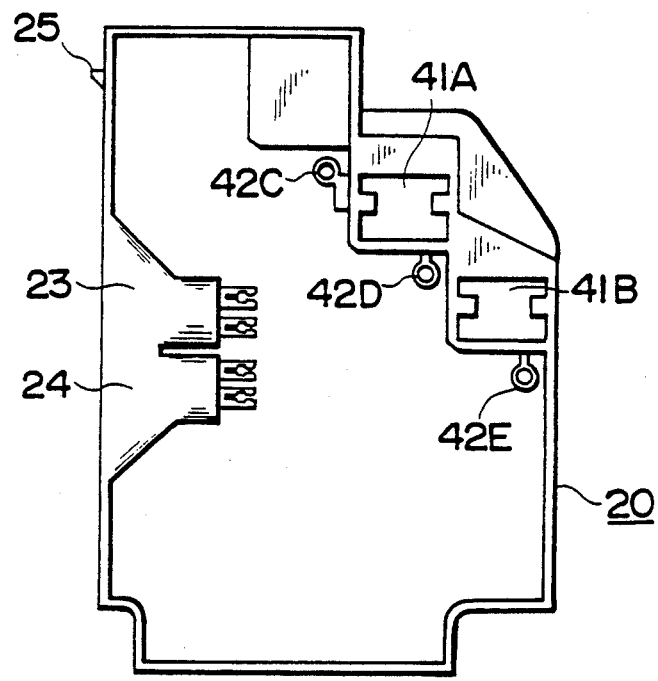
FIG. 6 is a right-side view and FIG. 7 a left-side view of a frame.
Figure 7:
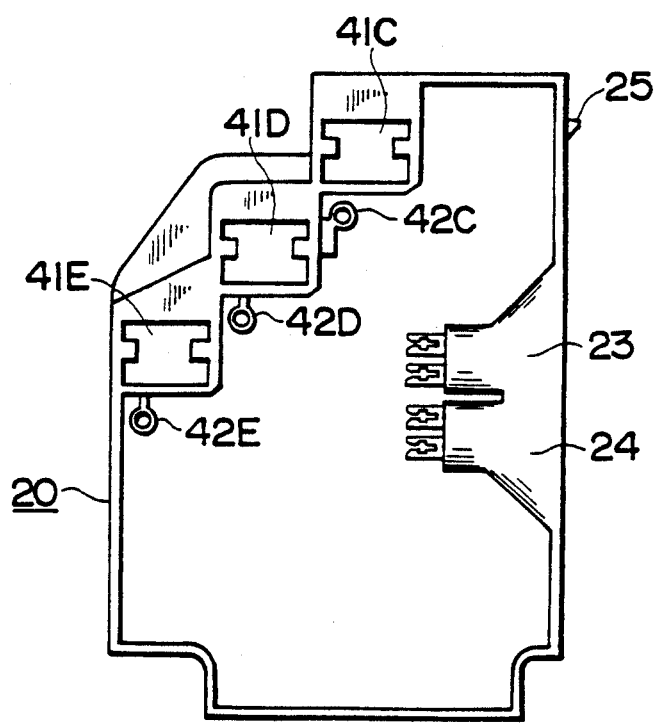

As best shown in FIGS. 6 and 7, the terminal base of the frame 20 is formed to include insert fixing grooves 41A, 41B and 41C, 41D, 41E into which the flat plate portions 39a and female screw portions 39b of the terminal attaching members 39 area inserted from the side. The fixing grooves 41A, 41B open in one side of the frame 20, and the other fixing grooves 41C–41D open in the other side of the frame 20. These grooves open also in the upper side of the terminal base, and the terminal attaching members 39 inserted into the fixing grooves are exposed from above. Further, cylindrical guides 42C, 42D, 42E, which are for guiding the lower end portions 39e of the pins of terminal attaching members 39, are formed integral with the frame 20, below the terminal base of the frame, for respective ones of the terminals 40C–40E.

Accordingly, after the printed circuit board 28 is secured to one side of the frame 20, the terminal attaching members 39 of the terminals 40A, 40B on one side are inserted into respective ones of the insert fixing grooves 41A, 41B, and the lower end portions 39d of the pins 39 of the attaching members are inserted into the holes 43A, 43B of the terminal board 28 and soldered, whereby the pins 39c will be connected to the wiring pattern on the circuit board 28. With regard to the terminals 40C–40E on the other side, the terminal attaching members 39 on the other side are inserted into the insert fixing grooves 41C–41E and the lower end portions 39e of the pins 39c thereof are passed through respective ones of the cylindrical guides 42C–42E and inserted into the holes 43C–43E of the circuit board 28 on one side thereof. By soldering the pins 39c at the lower end portions 39e thereof, the pins 39c can be connected to the wiring pattern on the circuit board 28.

Positioning of electrode pins of the light-emitting element 26 and light-receiving element 27 held by the element holder portions 23, 24 will now be described in detail. Since positioning is the same for both of the elements 26, 27, positioning of only one (light-emitting element 26) will be described.

As shown in FIGS. 8 and 9, the holder portion 23 is a horn-shaped member the central portion of which holds the light-emitting element 26. The rear portion of the holder 23 is provided with a positioning hook 45 of the kind shown. The positioning hook 45 comprises a pair of projections 46 provided at positions corresponding to electrode pins 26A of the light-emitting element 26. A slit 47 is provided at the center of each pair of the projections 46 and a cut-out 48 for inserting the corresponding electrode pin 26A is formed in the projections at the slit. A bent distal end portion of each electrode pint 26A of the light-emitting element 26 is clamped and retained by the cut-out portions 48 of the respective positioning hook 45. Accordingly, when the holder portion 23 is made to approach the printed circuit board 28 and installed, the electrode pins 26A can be readily inserted into the holes 45 of the printed circuit board 28 merely by being brought near the printed circuit board 28, and soldering is facilitated. The invention is applicable in similar fashion even if the number of element electrode pins is three or more.

The procedure through which the above-described photoelectric switch is assembled will now be set forth.

The display element 31 is attached to the cylindrical member 34 of the printed circuit board 29 and is connected to a predetermined wiring pattern on the printed circuit board 29. The light-emitting and light-receiving elements 26, 27 and the terminal attaching member 39 are attached to the frame 20, and the printed circuit boards 28, 29, 30 are attached to the frame 20. At this time, the plate shaped piece 33 is fitted into notch 32 in the upper side of the frame 20. The light-emitting and light-receiving elements 26, 27 and the terminal pins of the terminal attaching members 39 are connected to these printed circuit boards in the manner set forth above.

After one end of a cable, not shown, is attached and secured to the terminals 40A–40E using the screws 37, the frame 20 is inserted into the case body 10. At this time the resilient projections 25 of the frame 20 are mated with the openings 15 of the case 10 from the inner side thereof. Further, the sealing ring 14 is inserted into the groove 13 of the case body 10, and the main body cover 50 is attached from above. The cover 50 is secured by mating its projections 52 with the openings 15 of the case 10 from the outer side. The main body cover 50 and the rear portion of the case body 10 are screwed together by the screw 53.

Such an arrangement enables the photoelectric switch to be constructed with ease. Since the groove 13 is formed in the case body 10 and the main body cover 50 is attached via the sealing ring 14 in this arrangement, the waterproof effect is enhanced to improve the resistance of the switch to water. In addition, since the terminal base portion is opened by opening the main body cover 50, the terminus of the cable can be readily attached to and detached from the terminals 40A–40E of the terminal base, thereby facilitating maintenance and inspection activities.

Further, the cylindrical member 34 is secured to the circuit board 29, and the plate-shaped piece 33 that forms part of the upper side of the frame 20 is formed integral with the cylindrical member 34. The display element 31 need only be attached to the cylindrical portion 34. Accordingly, it is unnecessary to provide the frame with a display element opening and to insert the display element in terminal holes of the printed circuit board from thereabove. This makes it possible to improve assembly operability so that automatic assembly can be achieved.

Furthermore, the terminals 40A–40E can be readily inserted and attached to the frame within the photoelectric switch. Since the end portions of all terminal pins 39c can be connected by soldering at the printed circuit board 28 attached to one side of the frame, assembly operability can be greatly improved. In addition, since the terminal attaching portions 39 of the respective terminals are held by the insertion grooves 41A–41E, there is no danger of them being deformed or dislodged even by an upwardly directed force, and mechanical strength can be increased.

A terminal base cover will now be described with reference to FIGS. 1, 3, 10, 11 and 12. The terminal base cover, indicated at numeral 55, is for covering the terminals 40A, 40C and 40D and is so adapted that a hand, a screwdriver or the terminals of a tester or the like will not contact these terminals when the other terminals are manipulated.

As mentioned above, the terminal base of the upper portion of frame 20 is formed to have recessed portions in which the terminals 40A–40E are provided. The terminal base cover 55 is formed to have side protrusions 55a, 55b which mate with the recessed portions at which the terminals 40A, 40D are provided, as well as a planar portion 55c which extends in the direction of terminal 40C. Terminal characters A, C, D (or terminal numbers 1, 3, 4, etc.) identifying the terminals are written on the upper surface of the terminal cover 55, and a small aperture 57 is formed in the planar portion 55c at the position of a specific terminal, say the terminal 40C. A resilient projection 56 is provided at one end of the planar portion 55c of the terminal base cover 55.

When the protrusions 55a, 55b of the terminal cover 55 are inserted into the corresponding recessed portions of the terminal base, the terminal screws 37 of the terminals 40A, 40C and 40D are covered by the cover 55. The projection 56 of the terminal base cover 55 comes into abutting contact with the inner surface of the main body cover 50 so that the cover 55 is secured. When the photoelectric switch is adjusted, the main body cover 50 is detached. Since the terminal cover 55 is provided with the aperture 57, at this time the voltage which appears at the terminal screw of a particular terminal, namely the terminal 40C in this case, can be measured by inserting the terminal of a tester or the like from the aperture 57 without the tester terminal coming into contact with the other terminals. When the terminals 40B, 40E are manipulated, the terminals 40A, 40C, 40D covered by the cover 55 cannot be accidentally touched.

Described next will be a shielding plate 60 attached to the printed circuit board 28 to electromagnetically shield elements or circuitry provided on the circuit board 28, as shown by the phantom lines in FIG. 1.

Figure 13:
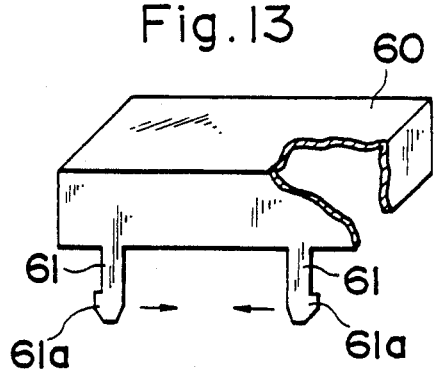
FIG. 13 is a perspective showing a shielding plate.
Figure 14:
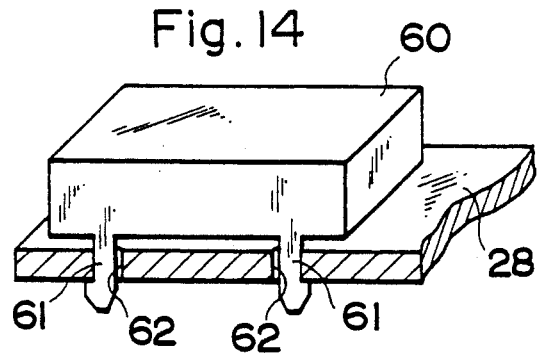
FIG. 14 is a perspective view showing the manner in which the shielding plate is attached to a printed circuit board.

The shielding plate 60, which is illustrated in FIG. 13, has a side wall the lower portion of which is provided with a plurality of projections 61. Each projection 61 has a sharply tapered distal end provided with a sidewardly extending anchoring portion 61a. As shown in FIG. 14, the projections 61 of this shielding plate 60 are inserted into openings 62 provided in the printed circuit board 28 in advance at positions corresponding to the positions of the projections. With such an arrangement, the projections 61 are inserted into the openings 62 while being flexed slightly in the directions of the arrows, with the projections engaging with the end portions of the openings 62 and being provisionally secured by the anchoring portions 61a. Accordingly, the shielding plate 60 will not fall off even if the printed circuit board 28 is turned upside-down along with the shielding plate. By soldering the projections 61 from below the printed circuit board 28, the shielding plate 60 is also electrically connected to a conductor pattern (ground) on the printed circuit board 28. Thus, the shielding plate 60 can be connected to the printed circuit board 28 without requiring a bending process.

Figure 15:
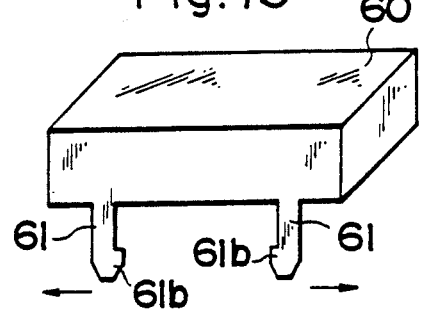
FIGS. 15 and 16 are perspective views illustrating other embodiments of the shielding plate.

FIG. 15 is a perspective view illustrating another embodiment of a shielding plate. As shown in FIG. 15, it is permissible for the projections 61 of the shielding plate 60 to be provided with anchoring portions 61b facing inwardly toward each other. When the shielding plate is inserted into the printed circuit board 28 in this case, the projections 61 flex slightly in the directions of the arrows while engaging the openings 62 in the printed circuit board 28. In this case also, therefore, the shielding plate 60 can be affixed by soldering.

Figure 16:
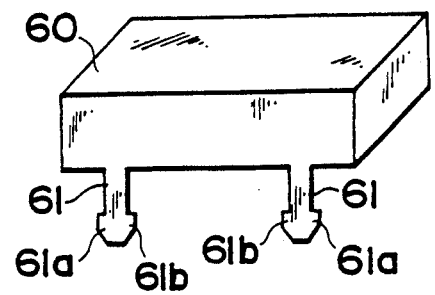

FIG. 16 illustrates still another embodiment. Here each projection 61 of the shielding plate 60 is provided with anchoring portions 61a, 61b on its left and right sides, respectively. By forming the openings 62 of printed circuit board 28 to conform to the shape of the projections 61, the shielding plate 60 is provisionally secured to the printed circuit board 28 in a similar manner, after which the distal end portions of the projections 61 are soldered to affix the shielding plate 60.

FIGS. 17 through 20 illustrate another embodiment and particularly are for describing a structure in which a filter such as a color filter or polarizing filter is attached in front of the light-receiving element (or light-emitting element). Portions in FIGS. 17 through 20 identical with those of the foregoing embodiment are designated by like reference characters and need not be described again.

A Fresnel lens 65 is attached in the front opening 11 of case body 10. The front side of the frame 20 is provided with openings 23a, 24a for the element holder portions 23, 24, respectively. The element holder portion 23 internally accommodating the light-receiving element 27 is provided with a filter 66 orthogonal to the optic axis of the light-receiving element 27. The element holder portion 23 is formed into a horn-shaped configuration, as mentioned earlier, and the interior thereof is formed to have a plurality of step portions, the outermost of which is indicated at numeral 69. The filter 66 is situated at the step portion 69. Inwardly directed projections 67 are formed at two locations spaced away from the step portion 69 by an amount equivalent to the thickness of the filter 66. The step portion 69 is provided with holes 68 necessary for fabricating, by molding, the frame 20 including the projections 67. The filter 66 has the same shape as the step portion 69, with a portion of the circular circumference thereof being cut away.

Figure 19:
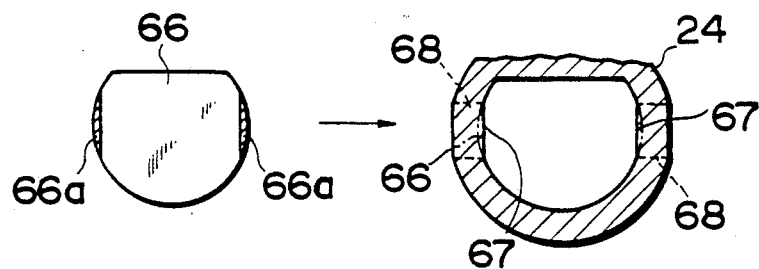
FIG. 19 is a sectional view taken along line IXX—IXX of FIG. 17.
Figure 20:
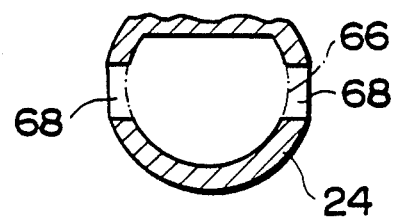
FIG. 20 is a sectional view taken along line XX—XX of FIG. 17.

The filter 66 is flexed slightly to be inserted at right angles to the optic axis of the element holder portion 24 of frame 20, whereby the filter 66 is inserted into the step portion 69 over the projections 67. With this arrangement, portions 66a indicated by the hatching in FIG. 19 are locked by the projections 67 so that the filter 66 is retained in the step portion 69.

Thus, the filter 66 can be attached without applying heat caulking to the photoelectric element holding portion and without deforming bosses. This improves assembly operability.

Figure 21:
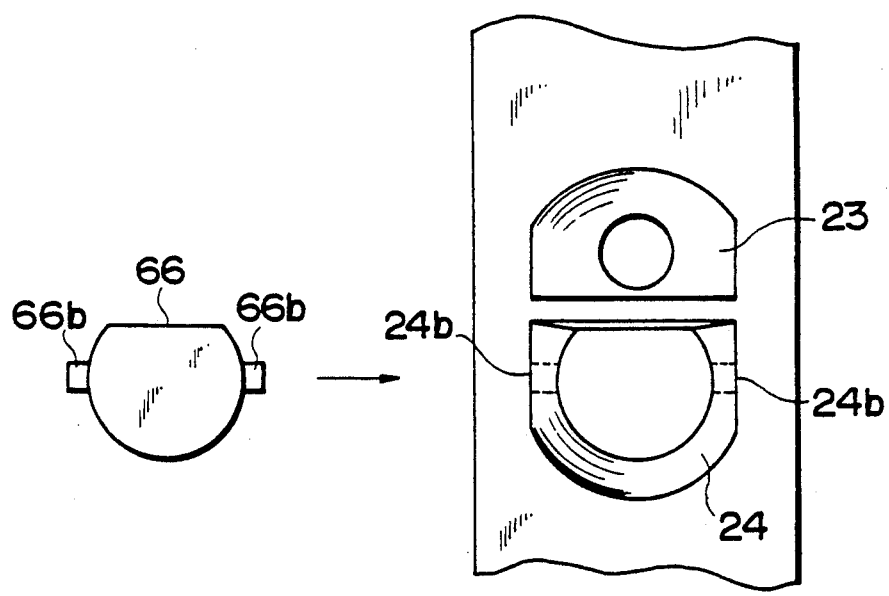
FIG. 21 illustrates another example of a filter.
Figure 30:
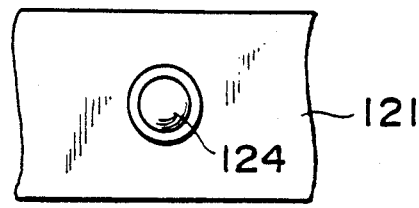
Figure 31:
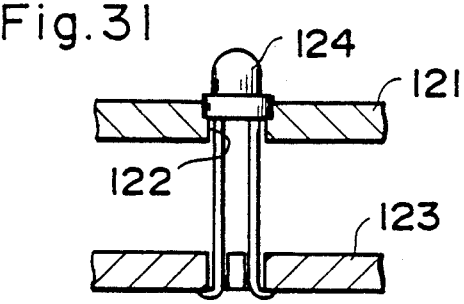
Figure 37:
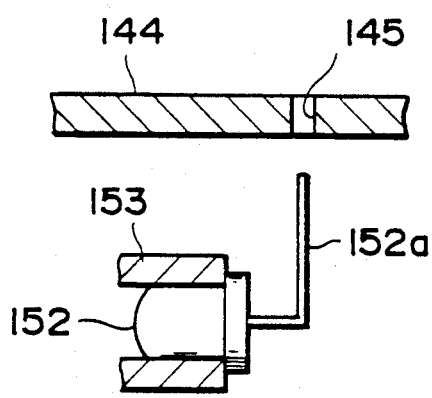
Figure 35:
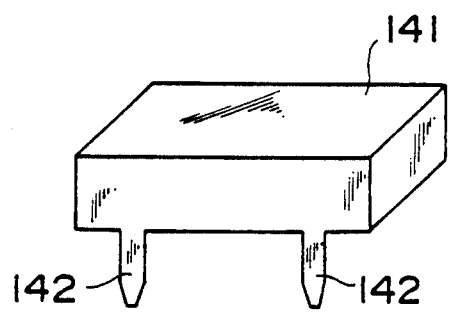
Figure 36:
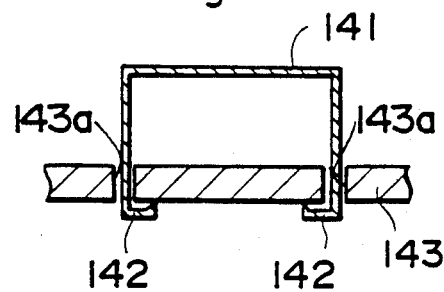
Figure 32:
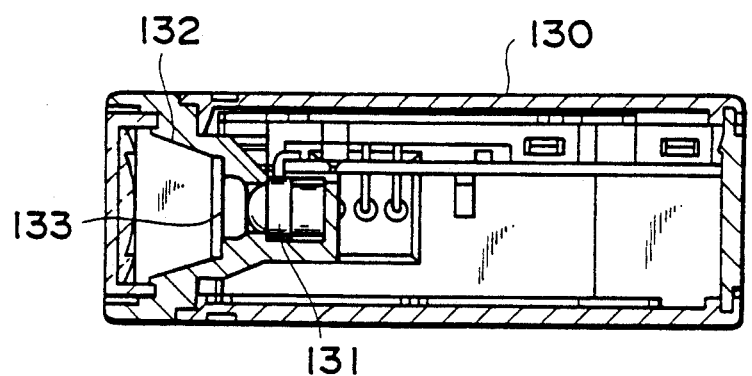
Figure 33:
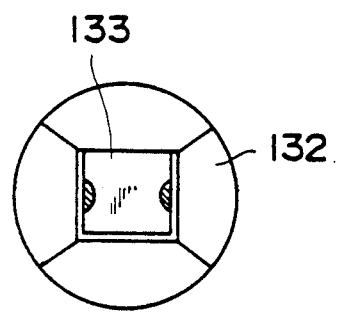
Figure 34:
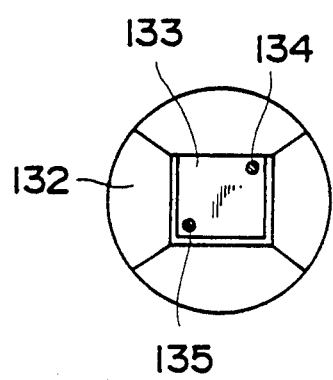

This embodiment is such that the filter 66, portions of which are cut away, is inserted into the element holder portion 24 so that both edges of the filter are retained by the projections 67 of the element holder portion 24. However, it is possible to adopt an arrangement as shown in FIG. 21, in which projecting pieces 66b are formed on the left and right sides of the filter 66 and recesses 24b, which are mating portions into which the projecting pieces 66b are inserted, are provided in the inner wall of the element holder portion 24. This arrangement allows the filter 66 to be retained by mating the projecting pieces 66b with the recesses 24b.

FIGS. 22 through 25 illustrate another embodiment, particularly an arrangement applicable to a light-emitting device or light-receiving device of both a reflection-type photoelectric switch of the kind illustrated in the foregoing embodiments and a transmission-type photoelectric switch possessing only a light-emitting or light-receiving element.

FIGS. 22, 23 and 24 are a front view, central longitudinal sectional view and rear view showing the structure of a lens plate attached at the front of the photoelectric switch. FIG. 25 is a longitudinal sectional view of a photoelectric switch using this lens plate. Portions identical with those of the foregoing embodiments are designated by like reference characters and need not be described again.

A lens plate 70 is attached in the opening 11 at the front side of the case body 10. The lens plate 70 is formed to have a Fresnel lens 71 on its rear side, with the center of the lens being at a position slightly below the center of the lens plate in terms of the height thereof. Arcuate grooves 72 are formed on the rear side of the lens plate 70 above the Fresnel lens 71. Though the grooves 72 are shaped to be approximately concentric with respect to the groove formed by the Fresnel lens 71, they need not have a lens function but are simply for decorative purposes. If this embodiment is applied to a light-receiving device of a transmission-type photoelectric switch, the light-receiving element 27 is attached solely to the element holder portion 24. The element holder portion 23 is not provided with any element. The printed circuit board in the case body 10 is provided with a detecting circuit connected to the light-receiving element.

If a light-emitting element is substituted for the light-receiving element and the printed circuit board is provided with a circuit for driving the light-receiving element, the device can be converted into one for emitting light. In case of a photoelectric switch of diffuse reflection or regressive reflection type, the light-emitting and light-receiving elements 26, 27 are respectively attached to the element holder portions 23, 24, as shown in FIG. 17, and a lens plate 73 having first and second Fresnel lenses 74, 75 is attached to the front side of th case, as depicted in FIGS. 26 and 27. With such an arrangement, a reflection-type photoelectric switch can be constructed by using the same case and frame and changing only the lens plate at the front of the case as well as the electronic circuitry (the printed circuit boards).

Though this embodiment has been described with regard to a photoelectric switch, the invention is applicable to various other types of electronic apparatus and not only photoelectric switches.

As many apparently widely different embodiments of the present invention can be made without departing from the spirit and scope thereof, it is to be understood that the invention is not limited to the specific embodiments thereof except as defined in the appended claims.

What is claimed is:

1. An electronic apparatus comprising:
a case body (10) having an opening in an upper side thereof, an annular groove (13) provided on the outer periphery of the opening and an engaging hole (15) in a portion of the case above the annular groove;
an annular sealing ring (14) inserted into said annular groove;
a frame (20) for supporting printed circuit boards (28,29,30) on which electronic circuitry is mounted, said frame being formed to include a terminal base provided on the side of the opening of said case body, said frame having a resilient projection (25) for mating with the engaging hole of said case body from an inner side thereof; and
a main body cover (50) provided with an inwardly directed projection (52) for mating with the engaging hole (15) of said case body from an outer side thereof, said main body cover covering said opening by mating the projection with the engaging hole of said case body.

2. An electronic apparatus comprising:
a case body (10) having an upper side which is open; and
a frame (20) for holding a printed circuit board (28) on which electronic circuitry is mounted, said frame being retained inside said case body and having a terminal base;
wherein said terminal base of said frame (20) is provided with the printed circuit board (28) on one side face thereof and has an insert fixing groove (41A-41E) for guiding a terminal attaching member (39) into said frame from the side and for preventing said terminal attaching member from being pulled out from above, and a terminal guide (42C, 42D, 42E) for guiding a pin (39e) of said terminal attaching member inserted from another side surface to the printed circuit board (28).

3. An electronic apparatus comprising:
a case (10);
a frame (20) disposed inside said case and on which parts are mounted; and
a display element (31) mounted on a printed circuit board (29) within said frame;
characterized by having a notch (32) formed in said frame at a position at which said display element is to be mounted, said notch being cut in from one side of said frame, and a cylindrical member (34) provided on the printed circuit board (29) and formed to have a plate-shaped piece (33) on one side thereof for mating with the notch of said frame, said display element being provided on said cylindrical member.

4. A photoelectric switch comprising:
a case (10); and
a photoelectric element holder portion (24) mounted within said case and facing a front side of said case for holding a photoelectric element (27);
characterized in that said photoelectric element holder portion is provided with a step (69) having a shape substantially the same as that of a filter (66) for holding the filter orthogonal to an optic axis, and a plurality of engaging portions (67), located at an outer periphery of said step, for engaging edge portions of said filter, wherein said filter is held within said step by engaging the edge portions thereof by said engaging portions of said photoelectric element holder portion.

5. A transmission-type photoelectric switch having a light-emitting element or a light-receiving element, characterized in that a lens plate (70) is provided in a rectangular opening (11) of a case (10), forms a central portion of a lens (71) at a position offset from the center of said lens plate, and forms arcuate grooves (72), having a shape approximately the same as that of the lens, at one side of said lens.

6. An electronic apparatus comprising:
   a case body (10) an upper side of which is open;
   a terminal base provided inside said case body and formed to include a plurality of terminal holding portions for power supply and output as recesses, said terminal base holding terminals (40A-40E) on a bottom side thereof;
   a terminal base cover (55) having protrusions (55a, 55b) which fit into the recesses of said terminal base for covering said plurality of terminal holding portions, an upper side of said terminal base cover having a resilient projection (56) and an aperture (57) at a position corresponding to the center of a predetermined terminal; and
   a main body cover (50) for covering the opening of said case body and abutting against said resilient projection of said terminal base cover.

7. An electronic apparatus equipped with a shielding plate, comprising:
   a shielding plate (60) a lower end of which has a plurality of projections (61), said projections having anchoring portions (61a, 61b) protruding at least to one side; and
   a printed circuit board (28) provided with holes (62) at positions corresponding to the projections of said shielding plate, said projections being inserted into said holes to connect said shielding plate to said printed circuit board.

8. An electronic apparatus in which an individual part is attached to a printed circuit board, comprising:
   a holder portion (23) for holding an individual part (26); and
   a positioning hook (45) provided at one end of said holder portion for holding a respective electrode pin (26A) of the individual part, said held electrode pin being fixedly inserted into an opening (45) of said printed circuit board (28).

* * * * *